United States Patent [19]

Marshall

[11] Patent Number: 5,790,636
[45] Date of Patent: *Aug. 4, 1998

[54] TELEPHONE TRAVEL CARD SYSTEM UNDER THE CONTROL OF ITS CUSTOMERS

[76] Inventor: Marvin E. Marshall, 2315 S. Occident St., Tampa, Fla. 33629

[*] Notice: This patent issued on a continued prosecution application filed under 37 CFR 1.53(d), and is subject to the twenty year patent term provisions of 35 U.S.C. 154(a)(2).

[21] Appl. No.: 299,397

[22] Filed: Sep. 1, 1994

Related U.S. Application Data

[63] Continuation of Ser. No. 758,031, Sep. 12, 1991, abandoned.

[51] Int. Cl.$^6$ .................................................. H04M 15/02
[52] U.S. Cl. ..................... 379/67; 379/91.02; 379/112; 379/196; 379/197
[58] Field of Search ........................... 379/196, 197, 379/189, 188, 112, 144, 34, 91, 67, 100, 59, 63

[56] References Cited

U.S. PATENT DOCUMENTS

| | | | |
|---|---|---|---|
| 4,777,646 | 10/1988 | Harris | 379/91 |
| 4,799,255 | 1/1989 | Billinger et al. | 379/189 |
| 4,853,952 | 8/1989 | Jachmann et al. | 379/88 |
| 4,935,956 | 6/1990 | Hellwarth et al. | 379/112 |
| 4,964,156 | 10/1990 | Blair | 379/189 |
| 5,003,584 | 3/1991 | Benyacar et al. | 379/119 |
| 5,023,868 | 6/1991 | Davidson et al. | 370/62 |
| 5,036,533 | 7/1991 | Carter et al. | 379/59 |
| 5,068,891 | 11/1991 | Marshall | 379/91 |
| 5,109,405 | 4/1992 | Morganstein | 379/89 |
| 5,163,086 | 11/1992 | Ahearn et al. | 379/91 |
| 5,193,110 | 3/1993 | Jones et al. | 379/94 |
| 5,204,894 | 4/1993 | Darden | 379/88 |
| 5,222,120 | 6/1993 | McLeod et al. | 379/88 |
| 5,222,125 | 6/1993 | Creswell et al. | 379/67 |
| 5,241,586 | 8/1993 | Wilson et al. | 379/88 |
| 5,375,161 | 12/1994 | Fuller et al. | 379/57 |
| 5,440,621 | 8/1995 | Castro | 379/112 |

FOREIGN PATENT DOCUMENTS

WO90/15496  12/1990  WIPO .................................. 379/144

OTHER PUBLICATIONS

"Voice Processing Applications for the Central Office", G.C. Carr, *Telephone Engineer & Management*, Mar. 1, 1989 (4 pages) [379/89].

"The Building of Intelligent Networks...", J. Dunogue et al., *Commutation & Transmission*(France), No. 2-1989, pp. 5–22 [379/207].

*Primary Examiner*—Krista Zele
*Assistant Examiner*—Daniel S. Hunter
*Attorney, Agent, or Firm*—Reed Smith Shaw & McClay

[57] ABSTRACT

A telephone system for travel card users where the users may program a switch processor so that it completes, re-routes, or refuses to complete calls as predetermined by the customer. Data is captured as it is transferred from the switching module to an internal buffer and is fed through a digital communications path and an analog-to-digital and digital-to-analog converter to a switching station computer. The switching station computer is in communication with a data storage server computer and the data storage server computer is in communication with remote telephones and with computers and facsimile machines in remote customers' offices. The switching station computer is thus programmable by the customer and incoming calls are handled as predetermined by the customer. A voice response device provides verbal communication between the system and its users. The system enables its users to defeat or limit travel card fraud, to receive billing information on a real time or other preselected basis, and to gain miscellaneous business advantages from creative control of the switch processor.

19 Claims, 1 Drawing Sheet

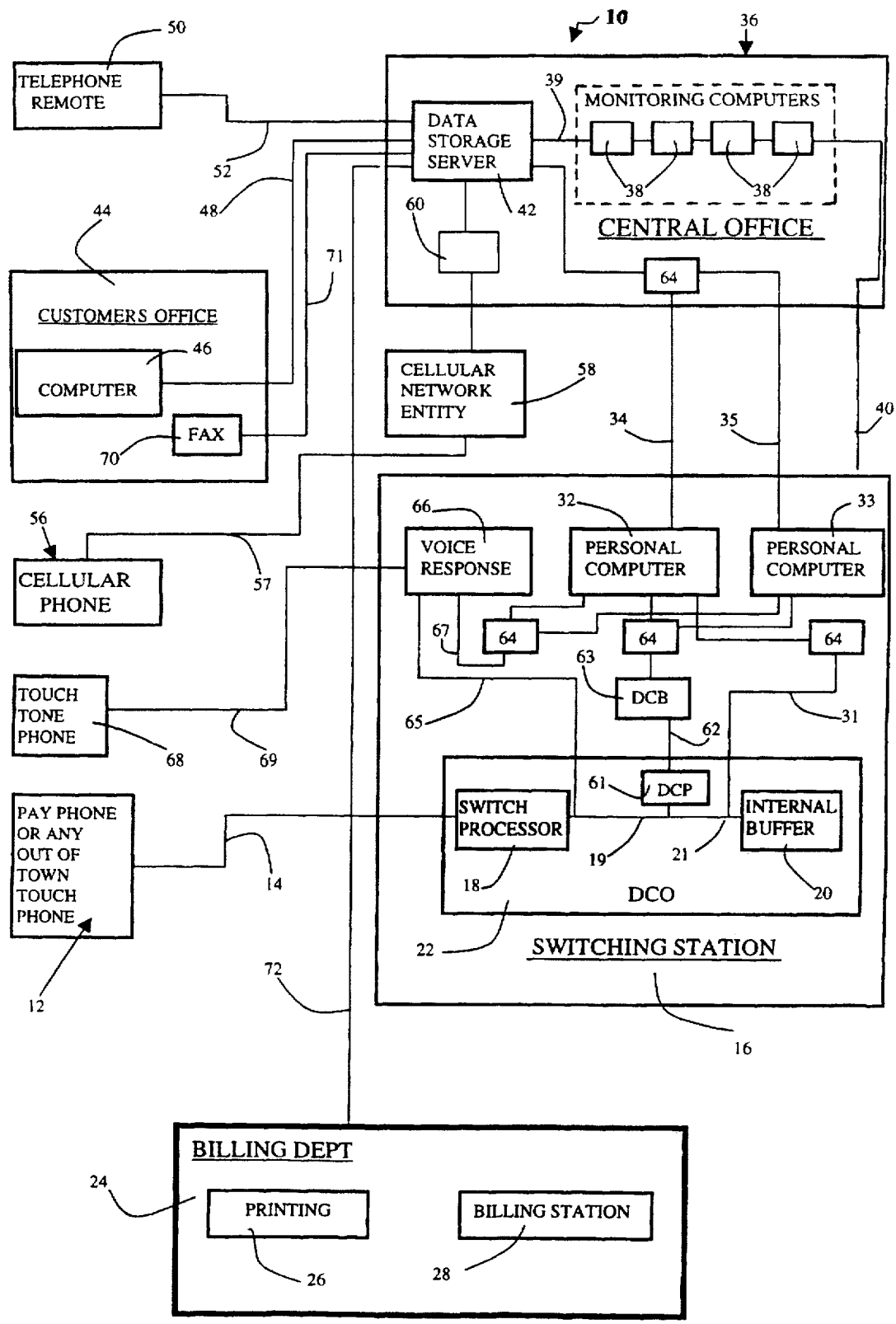

TELEPHONE TRAVEL CARD SYSTEM UNDER THE CONTROL OF ITS CUSTOMERS

This is a continuation of application Ser. No. 07/758,031 filed on Sep. 12, 1991 now abandoned.

BACKGROUND OF THE INVENTION

1. Field of the Invention

This invention relates, generally, to a telephone system that helps users of travel cards control their costs and limit their losses. More particularly, it relates to a system whereby the travel card customer can control use of the travel cards without relying upon the issuer of the cards.

2. Description of the Prior Art

A real time telephone system having utility in reducing losses due to travel card fraud was first introduced in 1990 by the present inventor; that system is disclosed in U.S. Pat. No. 5,068,891.

The essence of that breakthrough invention was its capture of data at a point between the DCO switching equipment of the telephone system and the internal buffer that temporarily stores data downloaded from said DCO switching equipment. However, in that earlier system, the data is downloaded and captured at the conclusion of a call.

Thus, the patented system interfaced with the DCO switch, but could not interact with it during a call. Thus, if a travel card user expended all of his or her travel card credit during a call, no means was provided where the call could be terminated while it was still in progress. An overseas call of several hours duration, for example, could result in losses to the card issuer or the customer of the issuer (depending upon which party absorbed the loss).

The earlier patent was a pioneering patent because it disclosed the first real time means for limiting travel card fraud by enabling the card customer to deactivate a PIN associated with any travel card anytime during the month when the credit balance on that card was exhausted. Before the disclosure of the patent, travel card customers were required to wait until the end of a monthly billing cycle before abuses could be detected; thus, an entire month of abuses could occur before such abuses were detected and stopped.

It should be understood, then, that the patented system was a system that interfaced with the DCO switch of an existing phone system, thereby eliminating the need to wait for the end of a billing cycle, but it was not a system that interacted with the DCO switch during a call.

What is needed, then, is an interactive system so that calls may be terminated, if desired, at the front end of or during progress of the call. A system accessible by those who use cellular telephones is also needed. Moreover, there is a need for a system equipped with a voice response means to increase the versatility of the system. A need also exists for the creative techniques for checking the validity of PINs.

However, the prior art, when considered as a whole at the time the present invention was made, neither taught nor suggested that these features would be desirable nor points the way to a system capable of providing them.

SUMMARY OF THE INVENTION

The present invention enables the customers of the issuers of travel cards to gain interactive access to the issuer's DCO switching equipment.

It therefore provides card validation and account status checking prior to the termination of a call.

It further provides means for determining whether or not an apparently valid PIN really is valid.

Additional features of the present invention include a voice response means and means for accessing the system through cellular telephones.

More particularly, personal computers (PCs) under the control of the card issuer and in communication with PCs of the customers of the issuer are an integral part of the DCO switching equipment so that the DCO switching equipment may be "programmed" by the customers to perform a variety of functions having utility to the customers of the travel card issuer.

Accordingly, a customer desiring to deactivate one or all of its PINs may deactivate them from its home office by simple communication with the DCO switching equipment through the issuer's PC. For example, most travel card customers will want to deactivate the PIN of an employee who is leaving the company for any reason, as mentioned earlier. If the customer wants to reroute the calls of certain sales people in the field, that also can be accomplished easily, and so on.

As a further example, if a home office wanted to leave a message with a salesperson in the field, the home office could instruct the issuer's PC at the DCO switching equipment and program it to activate an electronic voice response device that would provide the message to the salesperson when the salesperson made a call to any number with the travel card. Alternatively, the customer could program the issuer's PC of the switching equipment to re-route the salesperson's next call to the home office so that regardless of the number called by the person in the field, that call would be directed to the home office and the desired message could be delivered.

Moreover, the home office, i.e., the customer of the travel card issuer, could program the issuer's PC of the switching equipment to monitor any number of parameters and to validate or invalidate attempted calls as desired. For example, a company having no salespersons with authority to travel into certain territories could program the issuer's PC of the switching equipment to invalidate any call originating from a state or other geographical region within which the presence of no salesperson was authorized. This important feature would prevent the use of purloined travel card and PINs in those states that were screened out by the issuer's PC of the DCO switching equipment. Similarly, a west coast company could program the issuer's PC of the DCO switching equipment to reject all calls attempted before 8:00 A.M., PST and an east coast firm could cause all calls made after 5:00 P.M. EST to be rejected. This would curtail the use of purloined accounts by east coast and west coast thieves, respectively, before and after the respective times, and would provide the Company with information concerning the capture of its confidential numbers by hackers. Numerous other techniques could be employed to both foil and catch telephone thieves.

To provide these and other features, a communications port in the form of a digital communications path is added to DCO switching equipment under the control of the travel card issuer, and that port is connected to a personal computer and a backup, redundant personal computer owned by the issuer, as in the earlier patented system. Through the use of its own PC and standard programming techniques, each customer of the travel card user can program the issuer's PC to cause the DCO switching equipment to activate voice response messages, re-route calls, change the parameters for validating attempted calls, and the like.

As mentioned earlier, the novel system includes a voice response device that is connected to a personal computer controlled by the issuer and to the DCO switching equipment as well. If a home office of a travel card user decides that certain salespersons, for example, are not authorized to leave voice response messages, the personal computer in the home office is used to program the issuer's PC to instruct the DCO switching equipment to refuse access to the voice response device if the call thereto originates from an unauthorized travel card holder. In practice, the DCO switching equipment notifies the issuer's computer that a caller is attempting to activate the voice response device. In response to this notification, the issuer's personal computer searches its memory to determine whether or not the particular caller holds an authorization to activate said voice response device. The issuer's personal computer then sends a signal to the DCO switching equipment to either validate or invalidate the call so that the voice response device may or may not be activated, respectively; importantly, the issuer's computer merely follows instructions as programmed into it by the costumer's computer.

The DCO switching equipment notifies the issuer's personal computer of each and every incoming call. That PC checks its memory to validate the account number and the PIN, and either instructs the DCO equipment to complete the call as dialed, or to re-route the call to the home office, to the voice response device, or the like, all as determined by the computer in the customer's home office.

The system preferably includes a bank of monitoring computers that monitor usage of the system by all callers. All of the monitoring computers store information collected by them in a data storage server computer that is in communication with the issuer's personal computer and hence the DCO switching equipment.

The customer has access to the data storage server computer and, accordingly, can order billing information at any time, and can cause the billing information to be printed over a facsimile machine in the customer's home office so that a hard copy thereof is provided.

The system is also accessible by cellular telephones.

It is therefore apparent that the primary object of this invention is to enable the customer of a travel card system to control use of the system by its card holders for miscellaneous business advantages and to curtail travel card fraud and abuse.

Another important object is to enable travel card users to customize their travel card monitoring system to their particular requirements.

These and other important objects, features and advantages of the invention will become apparent as this description proceeds.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWING

For a fuller understanding of the nature and objects of the invention, reference should be made to the following detailed description, taken in connection with the accompanying drawing, in which:

The FIGURE is a block diagram of the novel system.

DETAILED DESCRIPTION OF THE PREFERRED EMBODIMENT

Referring now to the FIGURE, it will there be seen that an illustrative embodiment of the novel telephone system is denoted as a whole by the reference numeral 10.

System 10 includes telephone booth 12 which represents any fixed position telephone booth having Touch Tone (trademark) capability; it also represents any out of town Touch Tone telephone. Line 14 represents a dial-up connection between phone 12 and switch processor 18. When the novel system is in use, this dial-up connection will be the most commonly used connection; when a travel card user dials the number on his or her card, dial-up communication is established with switch processor 18. Dial-up communication can also be established between a remote phone 68 and voice response device 66, as indicated by dial-up line 69, or between a remote phone 50 and data storage server computer 42, as indicated by line 52. It should also be understood that phones 12, 68, and 50 represent any remote phone, and are depicted merely to better indicate the three dial-up connections just set forth.

The Digital Central Office (DCO) switch of the novel system is denoted 22 as a whole. In conventional telephone systems, the DCO switch includes switch processor 18 and internal buffer 20; in the novel system, DCO switch 22 further includes digital communication path (DCP) 61, the function of which is hereinafter described.

Box 36 at the top of the FIGURE denotes the Central Monitoring Office (CMO) that houses the DCO switch 18 in an illustrated embodiment of the invention; the CMO 36 and the switching station 16 are shown remote from one another in the FIGURE. It should be understood that the CMO is owned by or under the control of the travel card issuer.

Line 19 in DCO switch 22 interconnects switch processor 18 and internal buffer 20; that buffer serves as a temporary data storage means. Data carried by line 19 from switch processor 18 to buffer 20 is captured from point 21 by personal computer 32 containing capture software available from Utility Computer Co. of Monroe, La., or Info Systems of San Antonio, Tex., or other vendors. Any competent programmer having knowledge of the telecommunications industry can prepare a suitable capture program. Line 31 carries the captured data to "Y" block 64 which splits line 31 into the two depicted lines that go to PCs 32 and 33. Significantly, the data is captured in real time, at the front end of the call; thus, the novel system may take action relating to a call during the duration of the call, i.e., the system need not wait for the conclusion of the call. Thus, the system is termed "interactive" to distinguish it from an interface means.

Buffer 20 is connected to a more permanent data storage device such as a nine track tape, not shown. The CMO may further house a billing department 24 where the amounts due are tabulated, a printing department 26 where the bills are printed, and a billing station 28 from where the printed bills are distributed to the travel card customer's. The billing department 24 is depicted as being remote from the CMO in the FIGURE. Note line 72 that provides communication between billing department 24 and the data storage server 42 in the CMO 36.

Data is captured in real time as aforesaid and is input into the above-mentioned two way digital communications path (DCP) 61; the capture is transparent to the system, i.e., the transferring of data from the switch processor 18 to the internal buffer memory means 20 is unaffected by the capture. Note that the point of capture is upstream of point 21 in this particular embodiment. It should be noted that the capture of data at point 21 could also be accomplished by the DCP 61. A DCP is an optional port provided by manufacturers of DCO switches to bypass internal computers. Cable 62 electrically connects the DCP to digital conversion box (DCB) 63; that device converts digital signals to analog and vice versa.

Accordingly, real time data is made available to PCs 32 and 33; the DCP is connected to line 19 as shown and this connection enables the PCs to read and cross check all information transmitted through that line for PIN validity, voice response, credit limits, re-routing instructions, and other parameters that may be selected by the customer of the travel card issuer.

When the validity of the call has been checked, PC 32 or its backup sends proper analog instructions back to the DCB 63, through its RS232 port (provided as standard equipment on IBM and IBM-compatible PCs) and the DCB 63 converts said analog instructions into digital form so that it can be read into the DCP. These analog instructions to the PC 32 are provided by the travel card customer and may originate from computer 46 in the customer's office 44 or from any Touch Tone phone 68. Based upon the content of the information thereby supplied to the DCO switching equipment, the DCO may: 1) allow the call to proceed and terminate in the usual course, 2) pick up a voice response intercept over line 67 prior to call termination, or 3) re-route the call in the manner directed by said customer. The X.25 board employed in the earlier patented system is no longer needed with modern DCO switching equipment that is capable of supporting RS-232 asynchronous communications.

Digital information from switch processor 18 may be converted into analog information when it flows from said switch processor 18 to the PCs 32 and 33 and from analog to digital when it flows from the PCs 32 and 33 to the switch processor. Significantly, the DCP 61 provides access to the DCO switch 22 by the travel card customer, as will be more fully set forth hereinafter.

The boxes denoted 64, of which there are four in this embodiment, are "Y" blocks; they are used to split signals to the primary computer 32 and the redundant computer 33 from DCB 63, and to split the signals to said PCs 32 and 33 from all peripheral equipment as well. More particularly, as shown in the switching station box 16, the "Y" block on the left splits the signals from voice response unit 66 to said PCs 32 and 33, the central "Y" block splits the signal from the DCB 63 as already mentioned, and the "Y" block on the right splits the signal from point 21 where the transferred data is captured by the capture software in the PC's 32 and 33 in a manner that is transparent to the switch processor 18 and the internal buffer 20, as mentioned above. The fourth "Y" block is in CMO 36 and splits the signal from data storage server 42 to PCs 32, 33.

Lines 34 and 35 interconnect computers 32 and 33, respectively, to a bank of monitoring computers in the CMO, said monitoring computers being collectively denoted 38. Each monitoring computer 38 is connected to the other monitoring computers as shown and to data storage server computer 42 over line 39. Line 40 interconnects the monitoring computers 38 and switching station 16.

Monitoring computers 38 continuously analyze all data in the system; the card issuer or the customer may order reports of interest at any time. For example, if management desires a print out of an individual salesperson's activities on Mondays only, the monitoring computers perform the task of analyzing all data and providing the requested report. The variety of management reports available are unlimited as long as appropriate instructions are provided.

Note that remote Touch Tone phone 68 accesses voice response unit 66 through dial-up line 69, that line 65 interconnects voice response unit 66 and line 19, and that line 67 connects voice response unit 66 to "Y" box 64 and hence to the PCs 32 and 33. This allows any person having the proper clearance to broadcast messages to travel card holders over the voice response unit. Connection 67 between the voice response unit 66 and the PCs 32 and 33 allows the PCs 32 and 33 to verify whether or not the individual attempting to gain access to the voice response unit 66 from any Touch Tone phone 68 is authorized to have such access; if the attempted access is authorized, the caller may leave any message for broadcast.

PC 32 checks all parameters on the front side of each call, including instructions to give a voice response message to a predetermined caller. Thus, where an individual accesses the voice response unit 66 via the dial-up line 69 the PC 32 also checks to see if a message is to be delivered to that caller and if so, the message is delivered to the caller over line 69 through the voice response unit 66. The time required to deliver the message is measured by PC 32, and said PC deletes the message from the voice response unit 66 when said message has been delivered, unless the customer has programmed it to deliver the message to more than one caller. The PC 32 then sends information concerning the message to data storage server computer 42 in the CMO; the information includes the date and time the message was delivered and to whom it was delivered. PC 32 then communicates with the DCO switch 22 over line 62 and either validates the call as originally dialed, re-routes the call as provided by customer override instructions, or disallows the call if the caller has an insufficient credit balance, if the call is made from an area where no valid phone calls can be made, and the like.

As mentioned earlier, the parameters which may invalidate a call are infinite, limited only by the imagination and requirements of the customer. For example, if no 900 calls are authorized, the customer, using standard programming, may instruct the issuer's PC 32 to instruct the DCO switch 22 to disallow all 900 calls. Of course, all customers will program PC 32 to reject all calls using a PIN that is known to have been purloined. Other customers can program PC 32 to disallow all international calls, to only allow calls from or to a certain area code or prefix, or to allow calls only to certain numbers, and so on as aforesaid. Where a card has been programmed to allow only calls from a given travel card to certain numbers, the computer could detect an unauthorized use of such a card easily if the card user attempts to call an unauthorized number.

To provide a still fuller understanding of the invention, the course of a single call will be followed. When a call is received by the DCO switch 22, the long distance carrier provides the novel system with an Automatic Numbering Identification (ANI) that includes the area code, the three number prefix and the four numbers that follow the prefix of the number of the telephone from which the call was placed. The caller then enters a preassigned PIN; these two numbers (the ANI and the PIN) constitute two items of information. These two items are immediately passed through the DCP 61 and thence to the DCB 63 through cable 62. The DCB converts the digital signals to analog for compatibility with PCs 32 and 33.

PC 32 or its backup PC 33 has an internal clock; accordingly, it adds the exact time of call origination to the two items of information already received, thereby making a total of three items of information now in the novel system. Call validity and processing is based upon these three items of data. First, PC 32 checks to see if the caller's PIN matches a valid PIN. If it does not, a signal instructing the DCO switch 22 to not complete the call is sent back to the DCO switch 22 along the same path from where the three items of data were received, and the DCO switch 22 generates a message to the caller through the voice response device 66 that announces that the call will not be completed. The PC 32 records in its memory that the call was attempted, i.e., all three items of data are stored. If two additional invalid calls are attempted from the same telephone (as indicated by the ANI) within a predetermined period of time, then the switching station personal computer 32 instructs the DCO switch 22 to permanently block all future call attempts made from that number. Three attempts to make invalid calls thus creates a presumption that the card user is not an authorized user. Of course, the permanent block could be applied after a second invalid call, or even after the first, fourth, or some other number as selected by the user of the novel system.

If the attempted call passes this preliminary test, i.e., it is from an authorized location and the PIN appears to be valid, the novel system takes still further precautions before processing the call. More particularly, the PC 32 checks to see if the PIN entered by the caller is already in use on another call. Since there is only one valid PIN per card, if a dual usage is detected, the system knows the confidentiality of the PIN has been breached, and the voice response device 66 is activated to tell the caller that the call will not be completed.

If the dual use test is passed, the PC 32 then reads its memory to determine when and from where the same caller placed his or her previous call. The time and location of the previous call is compared to the time and location of the attempted call, and a decision is made based on that information as to whether or not the previous call and the attempted call were made by the same individual. For example, if the PC 32 determines that the preceding call was placed from Boston and the attempted call is originating in St. Louis only an hour later, the attempted call is deemed fraudulent and the caller is advised that the call will not be completed. Further usage of that card can then be permanently blocked.

If all of these validity tests are passed, a signal is then sent to the DCO switch 22 to complete the call if no customer-imposed limitations are in place. Of course, if customer-imposed limitations are present, such as call re-routing and the like, the DCO switch 22 completes the call in accordance with the customer's requirements. Where a customer has programmed a card so that it can only call certain numbers, the PC 32, through digital voice response device 66, will prompt the caller to enter the number to be called before validating the call; of course, if the caller then enters an invalid number, the call is not completed and further attempts to use that card may be blocked.

Still another feature of the present invention is its ability to provide billing information to its customer's at any time; thus, no user of the novel system is compelled to wait for the completion of a thirty day billing cycle. Either computer 46 in the customer's office 44 or the customer's facsimile machine 70 may access data storage server 42 over dial-up lines 48 and 71, respectively; the server 42 is connected through "Y" connection 64 to PC 32. Thus, a customer wanting to know the current billings attributed to a certain salesperson in the field, or all salespeople, or the like, may access computer 32 and be provided with a current bill. A hard copy thereof may be obtained through facsimile machine 70 via dial-up line 71. In this way, the novel system may keep track of its telephone charges on a weekly basis or even on a real time basis, or any other basis selected. Similarly, remote callers may dial up data storage server computer 42 over line 52 and receive verbal billing reports from voice response device 66.

Similarly, a customer having a cellular phone 56 may access, via dial-up line 57, the data storage server computer 42 through any cellular network entity 58 and computer 60 dedicated thereto and thereby receive all of the benefits and safeguards provided to other system users.

Not only does the novel system include a switching module that is accessible to costumers of the the system, it also provides to the customer full information concerning the results of the controls imposed on the system by the customer such as calls attempted and completed or rejected pursuant to said controls. This information is available to the customer on a real time basis or as otherwise demanded by the customer. Moreover, the information may be delivered in any format and may include any data of interest to the customer or the travel card issuer.

The software that controls the operation of the novel system, known as Long Distance Service Software II, is commercially available from the present inventor.

This invention is clearly new and useful. Moreover, it was not obvious to those of ordinary skill in this art at the time it was made, in view of the prior art considered as a whole as required by law.

It will thus be seen that the objects set forth above, and those made apparent from the foregoing description, are efficiently attained and, since certain changes may be made in the above construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

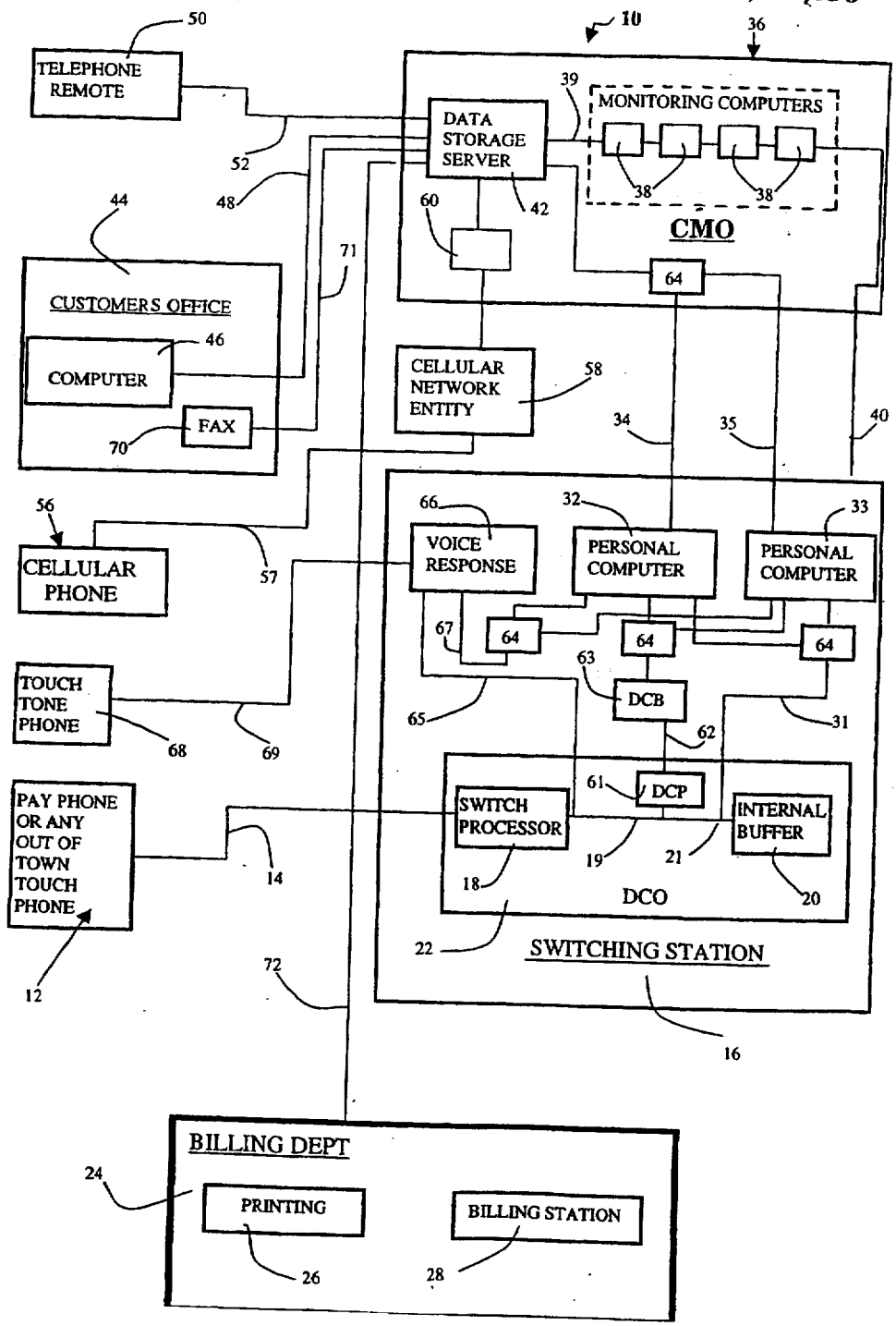

What is claimed is:

1. A telephone system of a type controllable by travel cards, comprising:

a switching station including a switch processor capable of receiving call data from at least one dial-up communication source and a switching computer means capable of processing call data;

said switching computer means controlling said switch processor;

communication means capable of capturing call data received by said switch processor, said call data including automatic number identification and a personal identification number;

said communication means capturing call data at front side of the call data received by the switch processor and supplying said call data to the switching computer means, and capable of supplying processed data from switching computer means to the switching station;

said switching computer means capable of obtaining data for at least one parameter related to a travel card in addition to said call data for the switching computer means to act upon in processing call data and determining from said data from the front side of the call data and additional parameter whether the attempted call is placed by a caller in good standing in accordance with parameters for the travel card;

said switching computer means capable of disallowing completion of a call through the switching station if determined from processing of call data and additional parameter by the switching computer means that the call is not placed by a caller in good standing; and said switching computer means capable of interrupting and terminating said call in progress through the switch processor if said switching computer means determines by data processing that the available account status of the travel card has been reached during the call.

2. The telephone system of the type controllable by travel cards as described in claim 1, further comprising a voice response device in electrical communication with said switch processor and said switching computer means, and capable of being in communication with at least one remote telephone, said voice response device with said switching computer means providing at least one of the following: to deliver a message to a caller using a travel card to make a call through the telephone system, to prevent a caller using a travel card to make a call through the telephone system, to leave a message for at least one subsequent caller using a travel card to make a call through the telephone system, and to permit a caller using a travel card to make a call through the telephone system to be automatically rerouted to a call number supplied to the system by a travel card customer.

3. The telephone system of the type controllable by travel cards as described in claim 1, further comprising a data storage server computer means in dial-up communication from at least one telephone and capable of providing accessibility to permit travel card customers to supply changes to the additional parameters in the switching computer means to act upon in processing call data from at least one selected travel card of the telephone system.

4. The telephone system of the type controllable by travel cards as described in claim 3, further comprising a monitoring computer means capable of storing customer billing information and providing through the data storage server means to a travel card customer billing information at any time through a computer or facsimile machine of the customer.

5. The telephone system of the type controllable by travel cards as described in claim 1, wherein said switching computer means performs a dual use test and directs the switching station through the communication means to prevent completion of an attempted call if by use of a personal identification number that is already in use within the telephone system.

6. The telephone system of the type controllable by travel cards as described in claim 1, wherein said switch computer means performs a geographical impossibility determination and directs the switching station through the communication means to prevent completion of an attempted call if a call is attempted using a travel card from a location indicated by the call data of the attempted call such that a caller would not have been able to travel to in the time between the call and an immediately preceding call using the same personal identification number of the travel card used in making the call.

7. The telephone system of the type controllable by travel cards as described in claim 1, wherein said switch computer means performs a repeated failed attempts determination and directs the switching station through the communication means to prevent repeated attempts to enter the telephone system from a particular dial-up communication source by using a series of invalid personal identification numbers within a predetermined period of time.

8. The telephone system of the type controllable by travel cards as described in claim 1, further comprising monitoring computer means electrically connected to said switching computer means and capable of storing call data, and a data storage server means electrically connected to the monitoring computer means and capable of access by travel card customers of the telephone system to provide current billing information to travel card customers.

9. The telephone system of the type controllable by travel cards as described in claim 8, wherein said data storage server means further enables a travel card customer of the telephone system to obtain a printed copy of said customer's current billing information through a customer's facsimile machine or computer.

10. The telephone system of the type controllable by travel cards as described in claim 1, further comprising a voice response means being capable of communication with said switching computer means and in dial-up communication with callers to the telephone system, and capable of providing an oral report of current account status to travel card users.

11. The telephone system of the type controllable by travel cards as described in claim 10, wherein the voice response means enables a customer of the system to leave an oral message in said voice response means so that at least one later travel card caller to the telephone system can hear said oral message.

12. The telephone system of the type controllable by travel cards as described in claim 1, wherein said switching computer means is capable of rerouting calls by travel card users to the telephone system in accordance with an additional parameter supplied by travel card customers.

13. The telephone system of the type controllable by travel cards as described in claim 1, further comprising a voice response means connected to said switching computer means and capable of dial-up communication with customers so that a travel card customer can change the additional parameters supplied to the switching computer means.

14. A telephone system of the type controllable by travel cards as described in claim 1 wherein the switching computer means determines from the call data and the data of the additional parameter at least one of the following for the switching station to act upon in processing call data: account balance status of the travel card at the beginning and during calls in progress, individual use test of the same personal identification number, geographically impossible calling with the same personal identification number, and unauthorized calling by the travel card user.

15. A telephone system of the type controllable by travel card's as described in claim 1 wherein the switching station includes in addition an internal buffer capable of at least temporarily storing call data received by the switch processor, a conductor means capable of providing electrical communication of call data from the switch processor to the buffer, and said communication means captures call data transparent to call data transfer from the switch processor to the internal buffer.

16. A telephone system of the type controllable by travel cards as described in claim 15 wherein said communication means is electrically connected to such conductor means.

17. A method of handling telephone calls by use of travel cards, comprising the steps of:

provit a switching station including a switch processor for receiving call data from at least one source capable of dial-up communication with said switch processor by use of a travel card and a switching computer means for processing call data received by said switch processor;

capturing call data received by said switch processor, said call data transmitted at dial-up including automatic number identification and a personal identification number;

delivering at least some captured data to said switching computer means;

supplying to said switch computer means at least one additional parameter related to the travel card to determine good standing;

processing in the switching computer means call data in relation to the received additional parameter data to determine if calls are placed and continued in good standing;

preventing connection of telephone calls if validation determines the call is not made by caller in good standing; and preventing continuation of telephone calls if validation determines the call is not continuing in good standing.

18. The method of claim 17, further comprising the additional steps of a travel card customer controlling selection of the additional parameters received by the switching computer means including deactivating personal identification numbers; and providing a dial-up connection capability between a remote telephone and a voice response means so that a caller may activate said voice response means and may receive messages from said voice response means.

19. A telephone system of the type controllable by travel cards as described in claim 1 wherein the communication means includes a port in the switch processor.

* * * * *

UNITED STATES PATENT AND TRADEMARK OFFICE
CERTIFICATE OF CORRECTION

PATENT NO. : 5,790,636

DATED : August 4, 1998

INVENTOR(S) : Marshall

It is certified that error appears in the above-indentified patent and that said Letters Patent is hereby corrected as shown below:

Page 1, INID Code[76] delete "2315 Occident St. Tampa, Fla. 33629" and replace with --5667 Stone Road, Suite 160, Centreville, VA 20120--

Page 1, INID Code[63] add at the end of the sentence --, which is a continuation-in-part of Serial No. 07/359,200, May 31, 1989, Patent No. 5,068,891 --

Col. 1, line 6 add the following to the end of the sentence --, which is a continuation-in-part of Serial No. 07/359,200, May 31, 1989, now issued as Patent No. 5,068,891.--

Col. 3, line 22 delete "notifies" and replace with -- can notify --

Col. 8, line 5 delete "costumers of the the" and replace with -- customers of the --

UNITED STATES PATENT AND TRADEMARK OFFICE
CERTIFICATE OF CORRECTION

PATENT NO.   : 5,790,636

DATED        : August 4, 1998

INVENTOR(S) :
   Marshall

It is certified that error appears in the above-indentified patent and that said Letters Patent is hereby corrected as shown below:

Please substitute the attached Figure for that currently on file. The corrections are:

In the Box labeled as 36, "CENTRAL OFFICE" has been deleted, and -- CMO -- has been substituted therefor.

In the Box labeled as 16, a lead line from Personal Computer 33 has been added, leading to the right hand Box labeled as 64.

Signed and Sealed this

Nineteenth Day of October, 1999

Attest:

Q. TODD DICKINSON

*Attesting Officer*    *Acting Commissioner of Patents and Trademarks*